(12) United States Patent
Kessler et al.

(10) Patent No.: US 6,460,289 B1
(45) Date of Patent: Oct. 8, 2002

(54) TREE SUPPORT DEVICE AND METHOD OF USE

(75) Inventors: Michael Gordon Kessler, Sandy, UT (US); Steve Hall, Riverton, UT (US)

(73) Assignee: S.K. Tree Products, LLC, Salt Lake City, UT (US)

( * ) Notice: Subject to any disclaimer, the term of this patent is extended or adjusted under 35 U.S.C. 154(b) by 0 days.

(21) Appl. No.: 09/636,106

(22) Filed: Aug. 10, 2000

Related U.S. Application Data

(60) Provisional application No. 60/150,520, filed on Aug. 23, 1999.

(51) Int. Cl.[7] .............................................. A01G 7/00
(52) U.S. Cl. ............................................................ 47/42
(58) Field of Search ...................................... 47/42, 43

(56) References Cited

U.S. PATENT DOCUMENTS

| | | |
|---|---|---|
| 3,040,477 A | 6/1962 | June |
| 4,222,198 A | 9/1980 | Napolitano et al. |
| 4,318,246 A | 3/1982 | Jungbluth et al. |
| 4,562,662 A | 1/1986 | Ten pas |
| 4,649,666 A | 3/1987 | Ness et al. |
| 4,852,299 A | 8/1989 | Smoak et al. |
| 4,967,506 A | 11/1990 | Lawson |
| 5,568,700 A | 10/1996 | Veneziano et al. |

*Primary Examiner*—Charles T. Jordan
*Assistant Examiner*—Francis T. Palo
(74) *Attorney, Agent, or Firm*—Workman, Nydegger & Seeley

(57) ABSTRACT

A tree support device is provided having a substantially W-shaped configuration. The device includes a cross member having first, second, and third elongated legs extending therefrom in substantially parallel alignment. The support device is made from an elastomeric material, such as gum rubber, and is openly exposed to degradation by ultraviolet light. In alternative embodiments, a substantially U-shaped support device or linear support device is made from the same elastomeric materials.

14 Claims, 3 Drawing Sheets

TREE SUPPORT DEVICE AND METHOD OF USE

This application claims priority to U.S. Provisional Application Ser. No. 60/150,520, filed on Aug. 23, 1999.

BACKGROUND OF THE INVENTION

1. The Field of the Invention

The present invention relates to tree support devices and, more specifically, apparatus for training and/or supporting newly transplanted trees so as to foster proper root and trunk development.

2. The Relevant Technology

Newly transplanted trees, particularly larger ones, often require temporary lateral support so as to prevent the tree from accidentally being knocked over or blown over by the wind. The conventional approach for supporting transplanted trees is to secure two or more ground stakes around the perimeter of the tree. Static lines, such as non-elastic rope or wire, are then tensioned between the tree and the stakes so as to rigidly support the tree.

Although this approach prevents the tree from being knocked or blown over, it has several disadvantages. For example, rigid support of the tree using static lines prevents substantially all lateral movement around the base of the tree. It has been determined that some lateral movement of the tree is desirable in that such movement stimulates root growth. Root growth is beneficial in that it increases the tree's independent ability to withstand wind and other forces once the support lines are removed.

Static lines can also produce localized stresses on the trunk of the tree when the tree is subject to high wind loads or other forces. Such localized stresses can distort or damage the trunk. Furthermore, static lines must be periodically monitored to ensure that they are adjusted, replaced, and/or removed as the tree grows. Failure to properly monitor the tree growth can again result in the static lines damaging the trunk and/or limbs of the tree. Such monitoring is often neglected in that the support lines are often intended to be left on for an extended period of time, typically over nine months.

BRIEF SUMMARY OF THE INVENTION

Accordingly, what is needed in the art are tree supporting devices that are easy to install and adjust. Such devices should be able to prevent the tree from being knocked or blown over and yet stimulate root development. In one embodiment, it would be desirable if the support device did not require monitoring of the tree growth or even removal of the support device.

In accordance with the present invention as broadly described and claimed herein, a tree support device is provided. In one embodiment, the tree support device comprises a substantially U-shaped body. The body includes an elongated first leg having a first end and an opposing second end, an elongated second leg having a first end and an opposing second end, and a cross member extending between the first end of the first and second legs. A slot is formed at the second end of each of the legs.

The body is typically formed by being stamp pressed from a sheet of an elastomeric material, such as gum rubber. The sheet typically has a thickness in a range from about 0.1 inches to about 0.5 inches. The elastomeric material is openly exposed so as to be subject to degradation by ultraviolet light.

During use, a pair of stakes are secured to the ground around the base of the tree. The cross member of the support device is wrapped around the trunk of a tree. The second end of the first leg is then secured to one of the stakes. This is typically accomplished by passing the top end of the stake through the slot at the second end of the leg. The second end of the second leg is then secured to the other stake. The stakes are positioned so that the support device is lightly tensioned when attached.

As a result of the support device being formed from an elastomeric material, the trunk of the tree is permitted to flex or bend under wind loads. As discussed above, such movement stimulates root growth for proper development. The soft and flexible properties of the device also limit localized stresses, thereby preventing damage to the trunk. Furthermore, as a result of the support device being subject to ultraviolet radiation, the device eventually looses its elastomeric properties and subsequently falls apart. As such, it is not necessary to monitor growth of the tree since adjustment or removal of the support device is typically not required.

In an alternative embodiment of the support device, a third leg is formed projecting from the cross member between the first leg and the second leg. This embodiment is also made out of the same material as discussed with regard to the U-shaped device. One additional benefit of the three legged device is that the additional third leg enables the tree to be supported by three stakes equally distributed at 120 degrees around the tree. The device thus provides a more uniform support around the tree.

Finally, in yet another alternative embodiment, linear straps made from the same elastomeric and ultraviolet light degradable materials can also be used for supporting newly transplanted trees.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
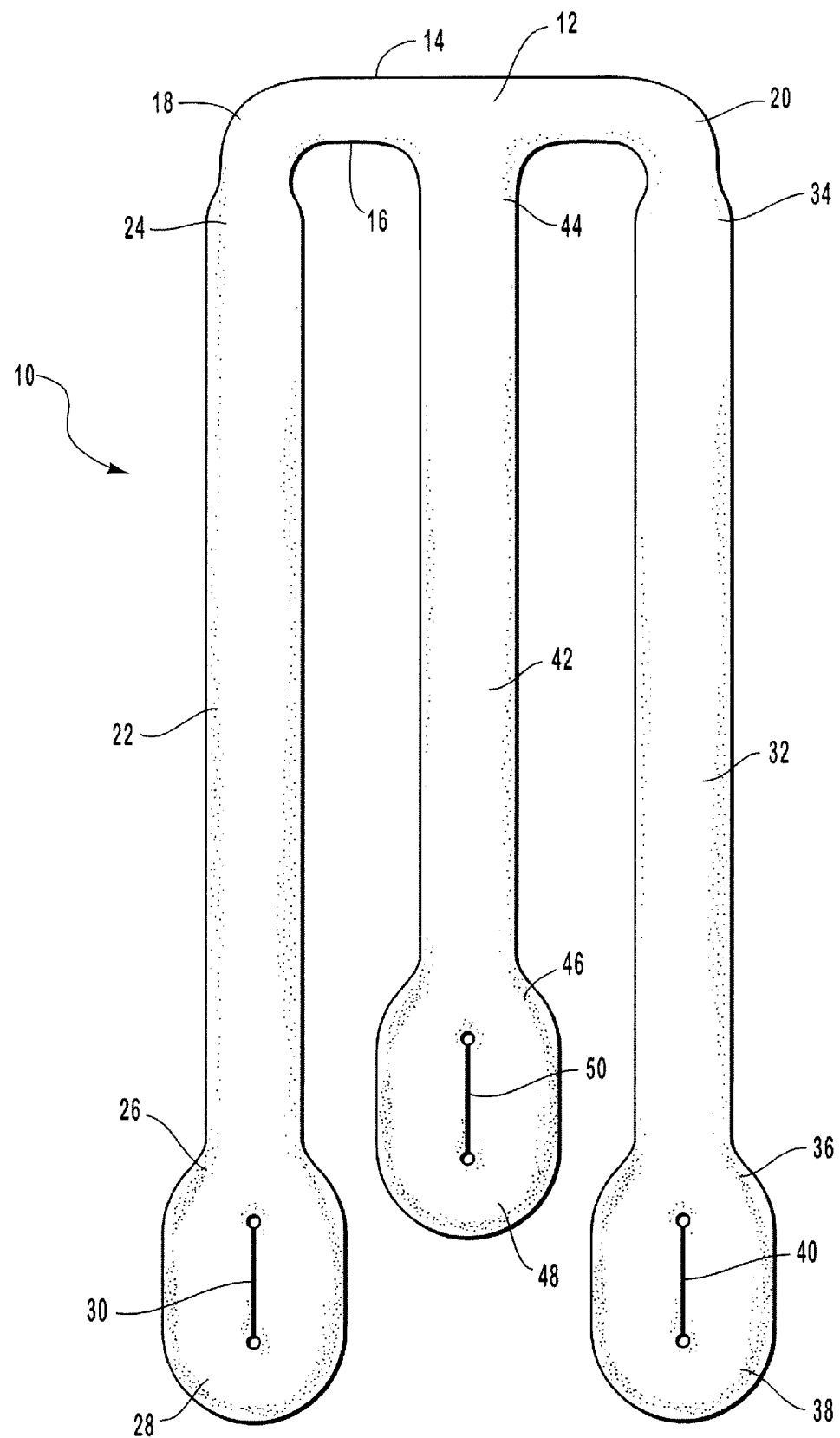
FIG. 1 is a top plan view of a three-legged tree support device.

Depicted in FIG. 1 is one embodiment of a tree support device 10 incorporating features of the present invention. Support device 10 has a substantially W-shaped configuration and includes a cross member 12, first leg 22, second leg 32, and third leg 42. Cross member 12 has a first edge 14 and an opposing second edge 16 each longitudinally extending between a first end 18 and an opposing second end 20. Elongated first leg 22 has a first end 24 secured to first end 18 of cross member 12 and an opposing second end 26 that is freely disposed.

In one embodiment of the present invention, means are provided for securing second end 26 of first leg 22 to a ground stake. By way of example and not by limitation, formed at second end 26 is an enlarged head 28 having a slot 30 extending therethrough. The top of a stake can be passed through slot 30 to secure attachment therewith. In alternative embodiments, one or more openings of different shapes can be formed on first leg 22. Furthermore various forms of clamps, ties, recessed pockets, and the like can be formed on first leg 22 for securing to a ground stake.

Second leg 32 has a first end 34 secured to second end 20 of cross member 12. Second leg 32 extends to a freely disposed second end 36 having an enlarged head 38 formed thereat. A slot 40 extends through head 38. Alternative means for securing second leg 32 to a ground stake, as discussed above, can also be formed at second end 36.

Finally, third leg 42 has a first end 44 secured to cross member 12 between first leg 22 and second leg 32. Third leg 42 also extends to a freely disposed second end 46 having an enlarged head 48 formed thereat. A slot 50 likewise extends through head 48. Alternative means for securing third leg 42 to a ground stake, as discussed above, can also be formed at second end 46.

In the embodiment depicted, cross member 12 is substantially linear with legs 22, 32, and 42 orthogonally projecting therefrom. As such, each of the legs are disposed in substantially parallel alignment when in an unstretched resting position. In alternative embodiments, cross member 12 can be curved or have an irregular configuration. Likewise, legs 22, 32, and 42 need not orthogonally project from cross member 12. For example, the legs can also project at an oblique angle to cross member 12. Furthermore, first leg 22 and second leg 32 can outwardly extend so as to be in longitudinal alignment with cross member 12. In yet another embodiment, third leg 42 and/or one of first leg 22 and second leg 32 can also be positioned to project from first edge 14 of cross member 12.

In one embodiment, tree support device 10 is formed as an integral unit by being stamp pressed from a sheet of elastomeric material. The sheet and thus resulting support device 10 typically has a thickness in a range between approximately 0.8 inches to about 1 inch, with about 0.8 inches to about 0.5 inches being preferred, and about 0.8 inches to about 0.25 inches being more preferred. In this configuration, tree support device 10 has a substantially uniformed thickness.

In alternative embodiments, support device 10 can be molded or otherwise formed. In such embodiments, each element of support device 10 can have any desired cross sectional configuration.

In one embodiment of the present invention, the elastomeric material comprises gum rubber. Alternative types of rubbers, other elastomeric materials, and compositions thereof can also be used. In one embodiment of the present invention, it is desirable that the elastomeric material be subject to ultraviolet light degradation. Gum rubber is one such type of material. The elastomeric materials typically have properties such that each leg can be stretched to a length at least twice and more preferably at least three times is original length without failure.

As depicted in FIG. 1, first leg 22 and second leg 32 have substantially the same length while third leg 42 is slightly shorter. As discussed below in greater detail, this is because during use, legs 22 and 32 are partially wrapped around the trunk of the tree and thus are effectively shortened. It is appreciated that cross member 12 and legs 22, 32, and 42 can be any desired length. Typically, the larger the tree to be supported, the larger the length of these elements.

Figure 2:
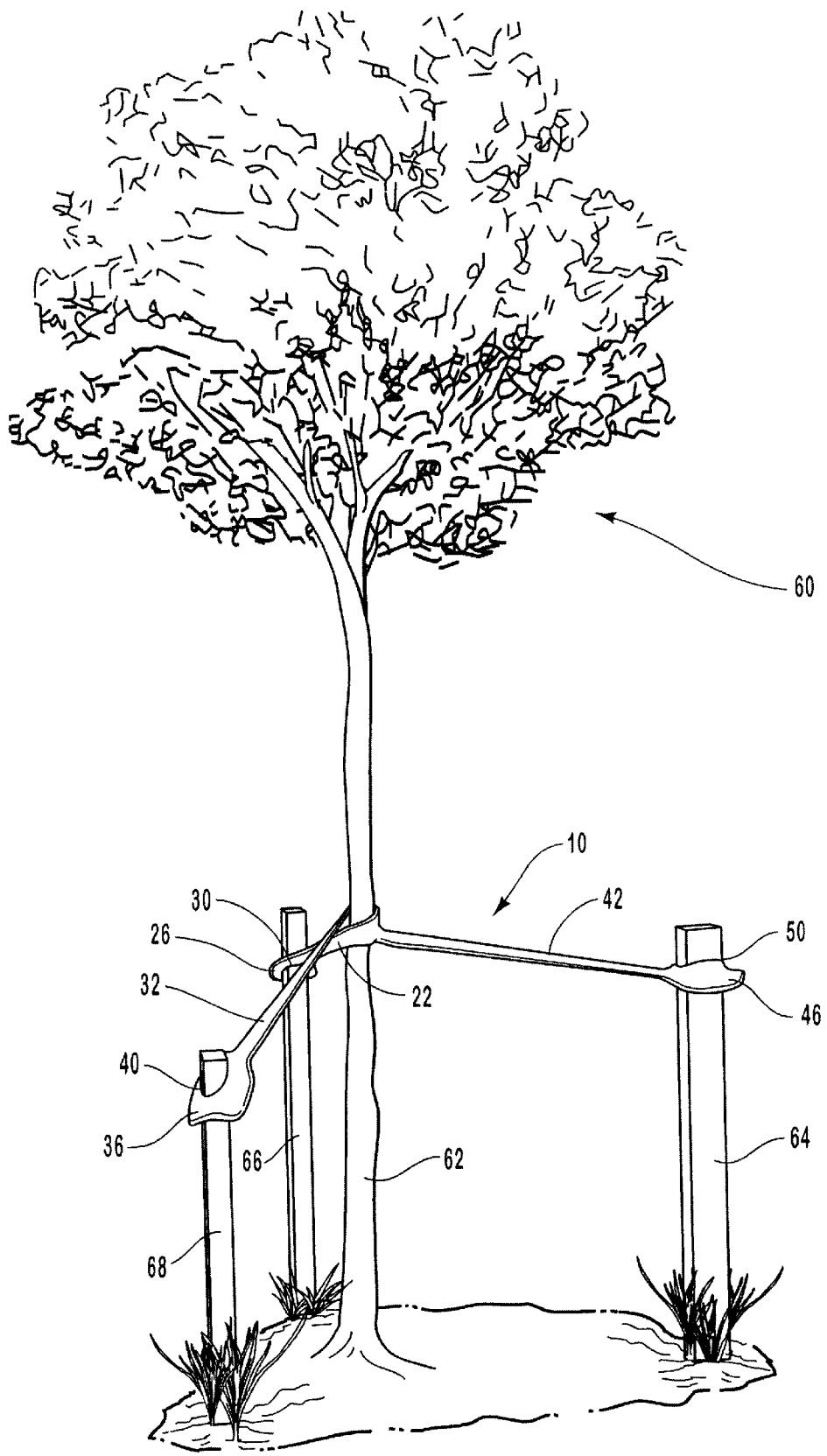
FIG. 2 is a perspective view of the tree support device shown in FIG. 1 being used to support a tree.

Depicted in FIG. 2, tree support device 10 is used to support a tree 60 having a trunk 62. During use, a first stake 64, second stake 66, and third stake 68 are driven or otherwise secured into the ground at desired positions around tree trunk 62. Typically, the stakes are positioned at 120 degrees apart from each other. The stakes can be wood, metal, or any other desired material.

In one method for attachment, third leg 42 is initially secured to first stake 64 by passing the top of first stake 64 through slot 50. Next, first leg 22 is partially wrapped around trunk 62 following which the top end of second stake 66 is passed through slot 30. Finally, second leg 32 is wrapped partially around trunk 62 in the direction opposite of first leg 22. The top of third stake 68 is then past through slot 40 of second leg 32. In this configuration, trunk 62 is evenly supported by support device 10 independent of which direction a lateral load is placed upon trunk 62.

Furthermore, as a result of the legs being tapered and curved at the intersection with cross member 12, support device 10 produces a uniformly smooth attachment against trunk 62, thereby limiting localized stresses or forces upon tree 60. In addition, as a result of support device 10 being made of elastomeric material, tree 60, and more particularly trunk 62, is permitted to have some lateral movement when high wind loads or other forces are applied to tree 60. This ability of the tree to have some lateral movement both stimulates root growth and prevents snapping or failure of the tree at the location of the support device.

As a result of device 10 being openly exposed and subject to ultraviolet degradation, device 10 will ultimately loose its elastomeric properties and subsequently crack and fall apart, similar to an old rubber band. As a result, there is no potential damage to the tree should one fail to remove device 10 from the tree as the tree continues to grow and expand. In this regard, the only need to remove the device and corresponding stakes is for esthetic purposes. It is of course desirable that device 10 loose its elastomeric and strength properties gradually over time so that as device 10 is weakening, tree 60, due to the expanding root system, is becoming stronger.

Figures 3, 4:
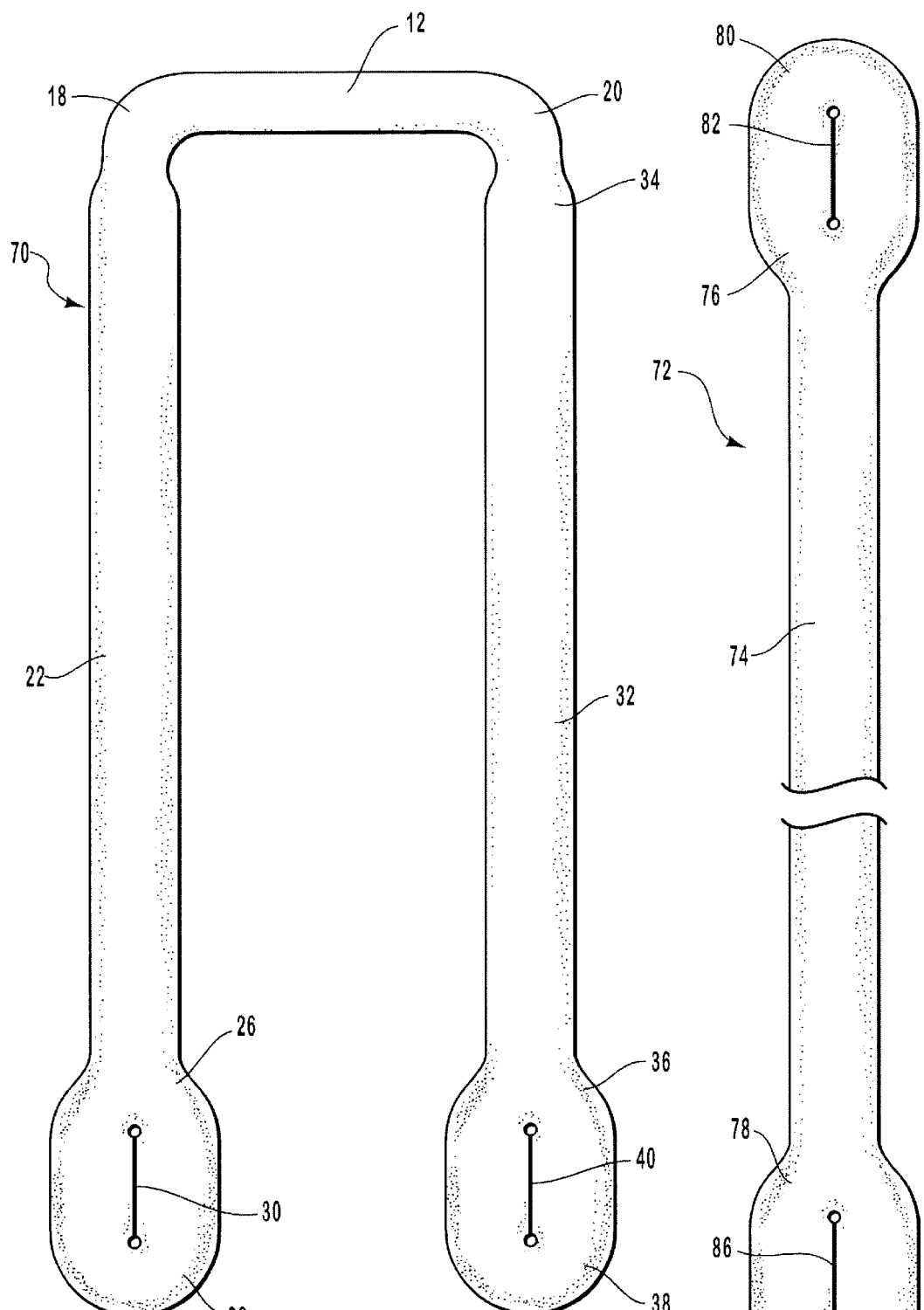
FIG. 3 is a top plan view of a two-legged tree support device.
FIG. 4 is a top plan view of a linear tree support device.

Depicted in FIG. 3 is an alternative embodiment of a tree support device 70. Tree support device 70 has a substantially U-shaped configuration and is substantially identical to previously discussed tree support device 10 except that third leg 42 has been removed. To avoid unnecessary repetition of description, like elements between support device 10 depicted in FIG. 1 and support device 70 depicted in FIG. 3 are identified by like reference characters.

Specifically, tree support device 70 includes first leg 22 and second leg 32 each projecting from cross member 12. The alternative design choices and material selections and properties as discussed with regard to support device 10 are also applicable to support device 70.

During use of support device 70, two stakes are position adjacent to tree 60. First end 26 of first leg 22 is secured to the first stake. Cross member 12 is then at least partially wrapped around the tree trunk 62. Second end 36 of second leg 32 is then secured to the second stake. Tree support 70 is often used for training previously bent trees or supporting trees where the direction of expected loads is known.

Support device 70 also performs the functions of stimulating root growth without hampering development of the tree. It also disintegrates over time so as to prevent damage to the tree should the device not be monitored and removed.

Depicted in FIG. 4 is a tree support device 72. Support device 72 comprises a linear strap 74 extending from a first end 76 to an opposing second end 78. Located at first end 76 is an enlarged head 80 having a slot 82 extending therethrough. Similarly, formed at second end 78 is an enlarged head 84 with a slot 86 extending therethrough. Support device 72 can also be made of the same materials and have the same properties as previously discussed with regard to support devices 10 and 70.

During use, strap 74 is wrapped in a U-shape around trunk 62 following which first end 76 is past through slot 86 at second end 78. First end 76 is then pulled creating a fixed loop which secures around tree trunk 62. First end 76 is then secured to an adjacent stake by passing the end of the stake through slot 82. One or more of tree support devices 72 can be secured on a tree at any desired angle to establish training or support of the tree.

In yet other alternative embodiments, it is appreciated that the tree support devices can be formed having four or more legs. Furthermore, it is also appreciated that two or more of the same or different tree support devices can be secured to an individual tree depending on the size and load requirements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A tree support device comprising:
   (a) a cross member extending between a first end and an opposing second end;
   (b) a first leg projecting from the first end of the cross member to an opposing first free end;
   (c) a second leg projecting from the second end of the cross member to an opposing second free end;
   (d) a third leg projecting from the cross member between the first leg and the second leg, the third leg terminating at a third free end, the cross member and each of the legs being a one piece construction formed from an elastomeric material; and
   (e) means formed at each free end for securing each leg to a corresponding ground stake.

2. A tree support device as recited in claim 1, wherein the means for securing comprises a slot formed at the free end of each leg.

3. A tree support device as recited in claim 1, wherein the cross member is substantially linear.

4. A tree support device as recited in claim 1, wherein the first leg projects substantially orthogonally from the cross member.

5. A tree support device as recited in claim 1, wherein the first leg and the second leg are oriented in substantially parallel alignment when in a natural resting position.

6. A tree support device as recited in claim 1, wherein at least one of the legs is formed from an elongated flat strip of elastomeric material having a thickness in a range between about 0.08 inches to about 1 inch.

7. A tree support device as recited in claim 1, wherein at least one of the legs is formed from an elongated flat strip of elastomeric material having a thickness in a range between about 0.08 inches to about 0.25 inches.

8. A tree support device as recited in claim 1, wherein the third leg has a length that is shorter than the length of either the first leg or the second leg.

9. A tree support device as recited in claim 1, wherein the elastomeric material comprises gum rubber.

10. A tree support device comprising a substantially U-shaped body having:
    (a) an elongated first leg extending between opposing first and second ends;
    (b) an elongated second leg extending between opposing first and second ends; and
    (c) a cross member extending between the first end of the first leg and the first end of the second leg, the body being a one piece construction formed from an elastomeric material that is freely exposed and subject to ultraviolet light degradation.

11. A tree support device as recited in claim 10, wherein the body is formed from a substantially flat sheet of elastomeric material having a thickness in a range between about 0.08 inches to about 0.5 inches.

12. A tree support device as recited in claim 10, wherein the elastomeric material comprises gum rubber.

13. A tree support device as recited in claim 10, further comprising a center leg extending from the cross member between the first leg and the second leg, the center leg terminating at a free end having a slot formed thereat.

14. A tree support device as recited in claim 10, where the elastomeric material has sufficient elasticity to enable the first leg to stretch a sufficient distance to double its length without failure.

* * * * *

UNITED STATES PATENT AND TRADEMARK OFFICE
CERTIFICATE OF CORRECTION

PATENT NO.    : 6,460,289 B1
DATED         : October 8, 2002
INVENTOR(S)   : Michael Gordon Kessler and Steve Hall It is certified that error appears in the above-identified patent and that said Letters Patent is hereby corrected as shown below:

<u>Title page,</u>
Item [56], References Cited, U.S. PATENT DOCUMENTS, insert the following patents:

|   |   |   |
|---|---|---|
| -- 3,226,882 | 1/1964  | Lichtenthaler |
| 4,897,956    | 2/1990  | McGuire |
| 5,253,393    | 10/1993 | Levin |
| 5,551,379    | 9/1996  | Hart |
| 5,876,167    | 3/1999  | Selby |
| 6,014,794    | 2/2000  | McCoy |
| 6,292,984    | 9/2001  | Nelson -- |

Signed and Sealed this

Eighth Day of April, 2003

JAMES E. ROGAN
*Director of the United States Patent and Trademark Office*